United States Patent
Narayan

(10) Patent No.: US 12,225,025 B2
(45) Date of Patent: *Feb. 11, 2025

(54) ENHANCED CLOUD INFRASTRUCTURE SECURITY THROUGH RUNTIME VISIBILITY INTO DEPLOYED SOFTWARE

(71) Applicant: Palo Alto Networks, Inc., Santa Clara, CA (US)

(72) Inventor: Krishnan Shankar Narayan, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/645,290

(22) Filed: Apr. 24, 2024

(65) Prior Publication Data
US 2024/0275801 A1    Aug. 15, 2024

Related U.S. Application Data

(63) Continuation of application No. 17/456,335, filed on Nov. 23, 2021, now Pat. No. 12,003,517.

(51) Int. Cl.
*H04L 9/40* (2022.01)

(52) U.S. Cl.
CPC ...... *H04L 63/1416* (2013.01); *H04L 63/0245* (2013.01); *H04L 63/0263* (2013.01);
(Continued)

(58) Field of Classification Search
CPC ............ H04L 63/1416; H04L 63/0245; H04L 63/0254; H04L 63/0263; H04L 63/1408;
(Continued)

(56) References Cited

U.S. PATENT DOCUMENTS 10,454,935 B2  10/2019  Parimi et al.
10,713,664 B1 *  7/2020  Alagappan ........... G06Q 30/018
(Continued)

FOREIGN PATENT DOCUMENTS

WO    2019139803 A1    7/2019

OTHER PUBLICATIONS

Palo Alto Networks, Inc., "App ID", Palo Alto Networks, Inc. Solution Brief, 2021, 5 pages.

*Primary Examiner* — Kostas J Katsikis
(74) *Attorney, Agent, or Firm* — Gilliam IP PLLC

(57) ABSTRACT

A system retrieves from cloud storage a packet(s) sampled from network traffic detected for software deployed on a cloud instance within a cloud environment. Each packet is inspected with deep packet inspection (DPI) to determine characteristics of the packet from which the identity/type of the corresponding software are determined. The system correlates the data/metadata generated from DPI with data/metadata of other cloud resources of the cloud environment based on determining the cloud resources to which the cloud instance is related or which also support deployment/execution of the software. The correlated data/metadata are evaluated based on security policies which include criteria for characteristics of software running on the cloud infrastructure rather than criteria for cloud infrastructure configuration alone. The system thus determines whether a cloud resource complies with the security policies based at least partly on the types/characteristics of software with which it is correlated.

20 Claims, 7 Drawing Sheets

(52) U.S. Cl.
CPC ...... *H04L 63/1408* (2013.01); *H04L 63/1441* (2013.01); *H04L 63/1466* (2013.01); *H04L 63/168* (2013.01); *H04L 63/20* (2013.01); *H04L 63/205* (2013.01)

(58) Field of Classification Search
CPC ............ H04L 63/1441; H04L 63/1466; H04L 63/168; H04L 63/164; H04L 63/20; H04L 63/205
See application file for complete search history.

(56) References Cited

U.S. PATENT DOCUMENTS

| | | | |
|---|---|---|---|
| 2012/0096525 A1* | 4/2012 | Bolgert | G06F 11/3006 726/6 |
| 2020/0228499 A1* | 7/2020 | Rajagopalan | G06F 21/57 |
| 2020/0258118 A1 | 8/2020 | Kovvali et al. | |
| 2022/0067484 A1 | 3/2022 | Karin et al. | |
| 2022/0092087 A1 | 3/2022 | Raghuramu et al. | |
| 2023/0034914 A1 | 2/2023 | Dong | |
| 2023/0069738 A1 | 3/2023 | Sreedhar et al. | |

* cited by examiner

ENHANCED CLOUD INFRASTRUCTURE SECURITY THROUGH RUNTIME VISIBILITY INTO DEPLOYED SOFTWARE

BACKGROUND

The disclosure generally relates to digital data processing and to security arrangements for protecting computers, components thereof, programs, or data against unauthorized activity.

Security standards and best practices for a variety of technologies have been developed which provide standardized requirements for ensuring that the use and configuration of those technologies is secure. For instance, the Center for Internet Security® (CIS) has published benchmarks for operating systems, cloud service providers (CSPs), server software, and other services/systems which specify conditions which should be met to reduce the risk of cyber threats which impact the end users of the services/systems or customers of the end users. As more organizations shift to delivering services in the cloud rather than on-premises, an increasing number of these organizations seek to ensure or certify compliance with security standards or best practices for cloud security. To establish and maintain compliance with security standards developed for CSPs which organizations utilize for hosting customer data or software in the cloud (e.g., applications delivered with the software-as-a-service (SaaS) model), the services of a cloud security vendor may be employed. Cloud security vendors test for and verify compliance with security standards, best practices, or other guidelines established for a CSP offering the resources used for offsite hosting. For instance, an organization may enlist a cloud security vendor to verify compliance with benchmarks for a particular CSP that are published by the CIS.

BRIEF DESCRIPTION OF THE DRAWINGS

Embodiments of the disclosure may be better understood by referencing the accompanying drawings.

DESCRIPTION

Figure 1:
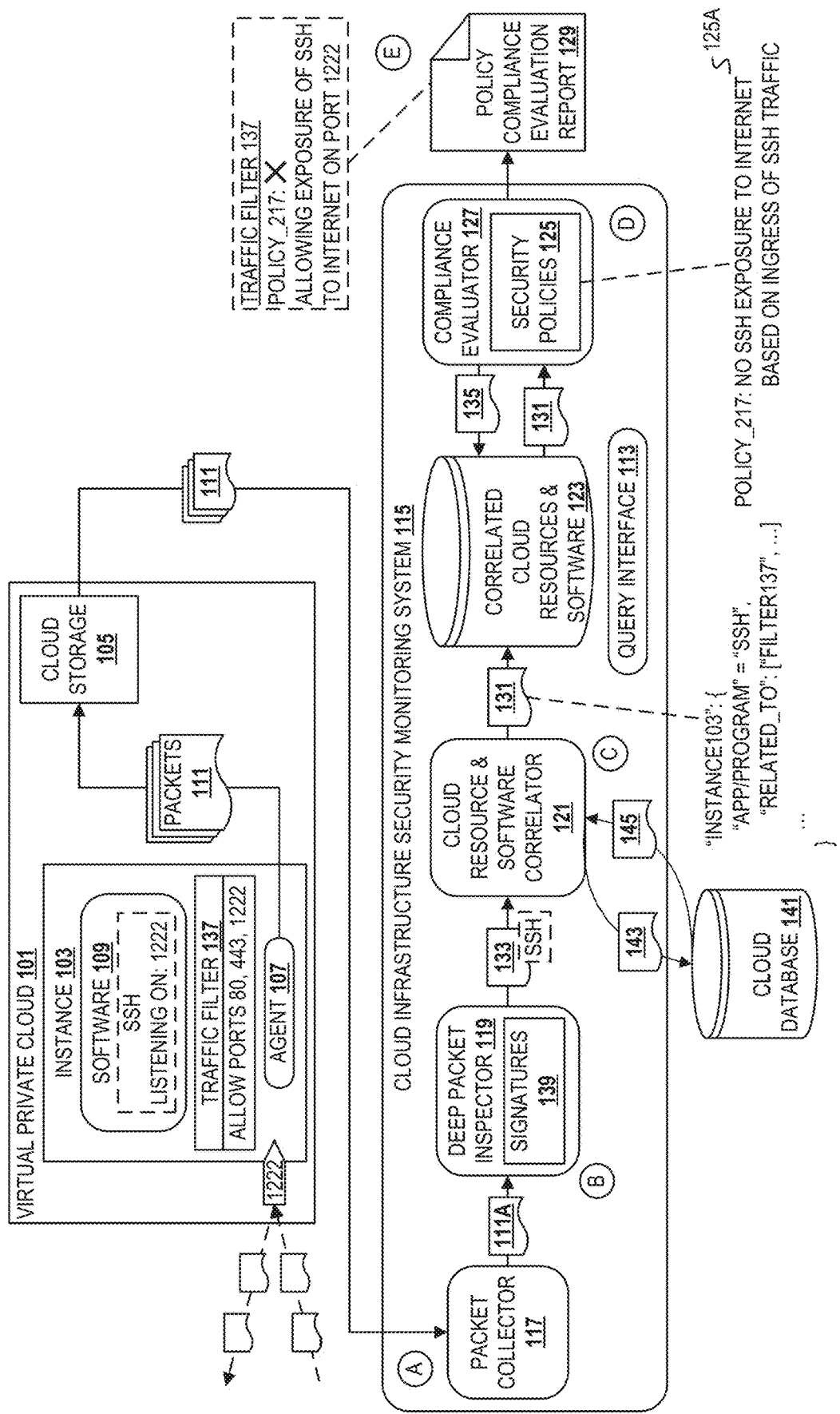
FIG. 1 depicts a conceptual diagram of gaining visibility into software running on cloud infrastructure to improve security monitoring of the cloud infrastructure.

The description that follows includes example systems, methods, techniques, and program flows that embody aspects of the disclosure. However, it is understood that this disclosure may be practiced without these specific details. For instance, this disclosure refers to performing deep packet inspection of packets by forwarding the packets to a virtual firewall capable of deep packet inspection in illustrative examples. Aspects of this disclosure pertaining to the performance of deep packet inspection can be instead applied to deep packet inspection services that execute locally or that are provided as external services. In other instances, well-known instruction instances, protocols, structures and techniques have not been shown in detail in order not to obfuscate the description.

Terminology

This description uses shorthand terms related to cloud technology for efficiency and ease of explanation. When referring to "a cloud resource," this description is referring to the resources of a CSP. For instance, cloud resources can encompass the servers, virtual machines, and storage devices of a CSP. In more general terms, a CSP resource accessible to customers is a resource owned/managed by the CSP entity that is accessible via network connections. Often, the access is in accordance with an application programming interface (API), or software development kit provided by the CSP. When referring to "cloud infrastructure," this description is referring to the collection of cloud resources of the CSP allocated to a tenant for running software in a cloud environment. For instance, cloud infrastructure can encompass the set of servers, virtual machines, storage devices, and other cloud resources provisioned for a virtual private cloud allocated to a tenant within a public cloud environment.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Overview

As part of monitoring security of cloud infrastructure, many cloud security vendors perform security checks on resources provided by the associated CSP, or cloud resources, to evaluate whether the cloud resources within the cloud infrastructure being monitored are configured and operating in accordance with security standards established for the CSP. For instance, the cloud security vendor can determine the port(s) of an instance provided by the CSP on which inbound and/or outbound traffic is allowed, the route table and subnet(s) associated with the instance, and other cloud resources having a relationship with the instance. However, without the ability to perform deep packet inspection by which information about software running on the cloud infrastructure can be obtained as part of these checks, the cloud security vendor will be unaware of higher-level characteristics which may impact satisfaction of the security standards. In particular, port-based protocol checks may not yield valid results, as applications or servers running in the cloud may be using nonstandard ports for the associated communication protocol, which is not reflected in the data/metadata of the cloud resources. This lack of visibility software running on the cloud infrastructure and relying solely on port numbers on which packets are received or sent out can yield both false negatives and false positives in determining whether the security standards are satisfied, resulting in security risks to the cloud environment going undetected as well benign cloud resources being falsely identified as posing security risk.

As described herein, a system enhances security monitoring for cloud infrastructure by gaining visibility into software (i.e., cloud applications or server software) running on the cloud infrastructure and extends security checks to encompass characteristics of the software in addition to characteristics of cloud infrastructure resources. Evaluation of the cloud infrastructure based on the security standards thus accounts for what is actually running on the infrastructure and how cloud resources are being used rather than the types and characteristics of cloud resources alone. The system retrieves from cloud storage a packet(s) that was sampled from network traffic detected for software deployed on a cloud instance provided by the CSP (e.g., a virtual server). The system performs deep packet inspection of the retrieved packet to determine characteristics of the packet and therefore the identity or type of software with which it is associated. The software may be an application (i.e., a SaaS application) or software for running a server, such as a web server or File Transfer Protocol (FTP) server. The system may perform the inspection by forwarding the packet to a firewall so that, upon inspection of the packet, the firewall generates log data indicating characteristics of the packet. Characteristics of the packet can include Internet Protocol (IP) addresses, port numbers, communication protocol, and whether the packet was sent over an encrypted connection. As a result of the deep packet inspection, the system has access to data/metadata pertaining to both the cloud resources of which the cloud infrastructure is comprised and to the software running on the cloud infrastructure.

After inspection of the packet, the system correlates the data/metadata generated from the inspection with the data/metadata of the cloud resources. The correlated data/metadata are evaluated based on a modified version of the security standards or other policies established for the CSP which include criteria for characteristics of software running on the cloud infrastructure rather than criteria for cloud infrastructure configuration alone. Because of this, the security standards/policies reflect higher-level security concerns which may not be identifiable from the infrastructure of the cloud/containerized environment and configurations of the cloud resources provisioned therein. The system thus determines whether a cloud resource complies with the security standards/policies based at least partly on the types or characteristics of software associated therewith. Cloud resources which may otherwise have been falsely determined to satisfy the security standards/policies without the context provided by the software executing thereon are detected as posing a security risk, thereby improving cloud infrastructure security monitoring and reducing undetected security risks.

Example Illustrations

FIG. 1 depicts a conceptual diagram of gaining visibility into software running on cloud infrastructure to improve security monitoring of the cloud infrastructure. A virtual private cloud (VPC) 101 provides a tenant with a private cloud environment within a public cloud offered by a CSP. As an example, the VPC 101 may be allocated to an enterprise/organization. An instance 103 runs in the VPC 101. The instance 103 is a cloud resource such as a virtual server or other cloud instance that is provided by the CSP for deployment of software in the cloud. While not depicted in FIG. 1 for clarity, the instance 103 has been configured with a network interface to allow for the instance 103 to send and receive network traffic. Software 109 executes on the instance. The software 109 may be software of the enterprise/organization that is hosted in the VPC 101. The software 109 comprises a secure shell (SSH) daemon which is listening on port 1222 and has thus been configured to listen on a non-standard port, as port 22 is the standard port for SSH per SSH protocol. A traffic filter 137 for the instance 103 has a first rule by which inbound network traffic is allowed on ports 80, 443, and 1222. The traffic filter 137 is a cloud resource offered by the CSP which provides for filtering of inbound and outbound network traffic for instances running in the VPC 101 based on enforcement of one or more rules with which it has been configured. For instance, the traffic filter 137 may be an Amazon Web Services® security group or other cloud resource implemented as a virtual firewall which performs rule-based filtering of network traffic sent to or from software executing on the instance 103.

An agent 107 is also installed on the instance 103. The agent 107 is an agent provided by the CSP that is configurable for remote monitoring and management of instances. The system 115 may communicate with a service of the CSP which provides agents to instantiate and configure the agent 107. As an example, the system 115 may submit a request to an API of the service to instantiate an agent on the instance 103 and push a configuration file(s) to the instantiated agent (e.g., via the API) to configure the agent 107. The type and/or configuration of the agent 107 can vary among CSPs. Additionally, FIG. 1 depicts an example in which the agent 107 is an agent for which the CSP manages deployment and functionality. Agent deployment configurations can vary among implementations. For instance, some CSPs may provide a packet sampling service that samples packets periodically from monitored network traffic across instances and ports and stores the sampled packet data in cloud storage for retrieval by the system 115, thus providing an agentless approach.

The agent 107 in this example has been configured by the system 115 to sample packets sent to and from software executing on the instance 103 across each port on which traffic is sent/received. Sampling of packets may be from network traffic corresponding to active sessions at the time of a packet sampling event, where packet sampling events may be defined according to a schedule or a time window. For instance, the agent 107 may perform hourly sampling of network traffic across ports associated with active sessions between client devices and software deployed to the instance 103. As another example, the agent 107 may sample packets from network traffic across sessions detected within a time window (e.g., five minutes). The agent 107 may sample a packet from incoming network traffic to the instance (e.g., the first packet sent during a session) and/or outgoing network traffic exiting the instance 103. The agent 107 may sample packets from network traffic by intercepting network traffic comprising one or more packets received or sent out on any port of the instance 103, extract (e.g., copy) the raw data of the packet(s) being intercepted, and store the raw packet data in the cloud storage 105 before redirecting the packet to its destination on the instance 103 (in the case of incoming traffic) or to the outgoing port (in the case of outgoing traffic). The mechanism by which the agent 107 samples packets from network traffic can vary among CSPs and agent implementations, however.

In this example, because the instance 103 is actively sending/receiving traffic on port 1222 for at least one session involving the software 109, the agent 107 samples packets from network traffic sent and received on port 1222. The agent 107 detects packets 111 from sampling and inserts the packets 111 into cloud storage 105. The cloud storage 105 is a cloud storage container that stores data for the VPC 101. The packets 111 comprise raw packet data sampled from detected network traffic. In this example, the packets 111 are packets sent on an SSH connection established between an SSH client and the SSH daemon of the software 109. A port of the instance 103 on which an SSH daemon is listening thus exposes the instance 103 to potential remote SSH connections established over the Internet as a result of inbound traffic on port 1222 being designated as permitted by the rules enforced by the traffic filter 137.

A cloud infrastructure security monitoring system ("system") 115 monitors security of the cloud infrastructure of the VPC 101. The cloud infrastructure of the VPC 101 refers to the collection of cloud infrastructure resources provisioned in association with the VPC 101, or the cloud environment offered by the CSP to a customer. The cloud infrastructure in this example within the VPC 101 comprises the instance 103, the traffic filter 137, and the cloud storage 105. These cloud infrastructure resources are depicted as an example, and the VPC 101 can comprise other cloud infrastructure resources in addition to those depicted.

FIG. 1 is annotated with a series of letters A-E. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

At stage A, a packet collector 117 of the system 115 obtains the packets 111 from cloud storage 105 for deep packet inspection to determine characteristics of the software executing on cloud resources within the VPC 101. Obtaining packets from the cloud storage 105 may be performed according to a schedule or after every N scheduled packet sampling events, such as hourly or after every five scheduled packet sampling events, respectively, which may be a parameter value or a configurable setting of the system 115. The packet collector 117 can obtain the packets 111 based on submission of a request to the cloud storage 105 via an API of the cloud storage 105 that indicates a location of the packets (e.g., a file path). The request may comprise one or more parameter values that specify the packet data which should be retrieved, such as a count of sampling time windows or packet sampling events, which may also be a configurable setting of the packet collector 117 or a parameter value(s) provided to the system 115. As another example, a service of the CSP offering the cloud storage 105 may be configured to forward packets collected by the agent 107 from sampling according to a schedule or a regular time interval (e.g., hourly, daily, etc.) or may stream packet data to the packet collector 117.

In other implementations, rather than the packet collector 117 initiating packet collection, sampled packet data can be streamed to the packet collector 117 by a streaming service offered by the CSP. In this case, a data stream can be established between the packet sampling service or cloud storage 105 and the packet collector 117. As packets are sampled within a brief time period (e.g., within five minutes each hour), the sampled packet data are sent to the packet collector 117 over the data stream. For instance, the data stream can be set up such that the raw packet data that the agent 107 samples and stores in a defined location in the cloud storage 105 (e.g., a particular file path) are streamed from the location in cloud storage 105 to the packet collector 117 via the data stream upon storage in the defined location. In this case, obtaining the raw packet data by the packet collector 117 is ongoing during the defined sampling windows/periods rather than a single collection event at the end of a sampling window/period.

The packet collector 117 may obtain the packets 111 in the form of a compressed file, wherein compression of the file containing raw packet data was performed by a service of the CSP as part of being exported from the cloud storage 105. The packet collector 117 can decompress the file comprising the packets 111 upon receipt so that the raw packet data sampled for the instance 103 is accessible for analysis. For clarity, subsequent operations are described as being performed for a first of the packets 111, or a packet 111A, though in implementations, the operations will be performed for each of the packets which the packet collector 117 obtains either through collection or streaming.

At stage B, the packet collector 117 forwards the packet 111A to a deep packet inspector 119 of the system 115 for inspection. The deep packet inspector 119 comprises a deep packet inspection (DPI) service. In some implementations, the deep packet inspector 119 may be implemented with a virtual firewall capable of DPI. While depicted as part of the system 115, the deep packet inspector 119 may be an external service or may execute on another server with which the system 115 communicates in other examples. The deep packet inspector 119 performs DPI of received packets to determine characteristics of the software associated with each of the packets. Characteristics of software may include application layer communication protocol associated with traffic detected for the software and/or whether traffic sent to and from the software is encrypted (e.g., for SSH or Transport Layer Security (TLS)/Secure Sockets Layer (SSL) traffic). In some examples, the characteristics may also include an identity of the software and/or software category. Signatures 139 that comprise signatures known to be associated with certain communication protocols and/or signatures of applications or other types of software are attached to (i.e., installed on other otherwise accessible to) the deep packet inspector 119. The deep packet inspector 119 can perform signature matching of the packet 111A against the signatures 139 as part of DPI to facilitate classification of the packets at high level of granularity.

The deep packet inspector 119 in this example determines that the packet 111A is SSH traffic. For instance, the deep packet inspector 119 can determine that the packet was encrypted according to SSH and/or match the packet to one of the signatures 139 which was created based on network traffic known to be associated with SSH traffic. The deep packet inspector 119 generates DPI data 133 that comprises characteristics of the software associated with the packet 111A that were determined from DPI, including an indication that the packet 111A corresponds to SSH traffic. The deep packet inspector 119 forwards the DPI data 133 to a cloud resource and software correlator ("correlator") 121 of the system 115.

At stage C, the correlator 121 determines the cloud resources of the VPC 101 with which the instance 103 and software 109 executing thereon are correlated. Cloud resources which are considered to be correlated with software executing in a cloud and its respective cloud instance include the cloud resource(s) which are related to the cloud instance and therefore support deployment of the software. Relationships between cloud resources may be indicated in data which describe the cloud resources. Data describing cloud resources are maintained by the CSP in a cloud database 141. The data which describe a cloud resource may comprise properties, key-value pairs, etc. which indicate identifiers of other cloud resources to which the cloud resource is related. The cloud database 141 is a database offered by the CSP which stores data of cloud resources provisioned in cloud environments such as the VPC 101. Cloud resources may be represented with structured data, such as data structured with JavaScript Object Notation (JSON), that are stored in the cloud database 141.

The correlator 121 queries the cloud database 141 for the cloud resource data maintained for the instance 103. The cloud database 141 may expose an API by which the correlator 121 can query the cloud database. A cloud resource query 143 at least indicates an identifier of the instance 103 for which the agent 107 sampled the packets 111 and may also indicate identifying information of the VPC 101 (e.g., an identifier of the associated cloud account with the CSP). The correlator 121 may determine the identifier of the instance 103 based on determining the cloud resource identifier in the VPC 101 which is associated with an IP address of the instance 103 (e.g., an IP address associated with the network interface defined for the instance 103) that was indicated in the packets 111. The correlator 121 retrieves cloud resource data 145 from the cloud database 141. The cloud resource data 145 should indicate other cloud resources in the VPC 101 with which the instance 103 is related. In this example, the instance 103 is related to at least the traffic filter 137 and the agent 107. The correlator 121 may determine the related cloud resources to the instance 103 based on lookups of the properties, key names, etc. in the cloud resource data 145 known to be associated with related cloud resources based on a schema of cloud resource data published by the CSP. Example types of other cloud resources that may be related to cloud instances that are omitted from FIG. 1 for clarity include network interfaces and subnets.

After obtaining the cloud resource data 145, the correlator 121 associates at least a subset of the DPI data 133 with indications of the cloud resources to which the instance 103 is related and generates correlated cloud resource and software data ("data") 131. The correlator 121 may, for instance, store the software type, identity, communication protocol, etc. and identifiers of the correlated cloud resources determined from the cloud resource data 145 in an object to generate the data 131. The correlator 121 may also store the IP address associated with the software 109 which was indicated in the packet 111A as part of generating the data 131 to aid in discerning between software executing on the instance 103. In this example, the data 131 at least indicates that the software 109 running on the instance 103 was determined to be using SSH and that the traffic filter 137 and agent 107 are related to the instance 103. The correlator 121 inserts the data 131 into a repository 123 of correlated cloud resources and software running in the VPC 101. The repository 123 may be indexed by identifiers of instances deployed in the VPC 101 so that queries to the repository 123 which indicate an instance identifier return an indication(s) of the software running on the instance and an indication(s) of the other cloud resources to which the instance is related. While depicted as part of the system 115, in some examples, the repository 123 may be maintained external to the system 115 (e.g., on an external server or cloud-based server).

At stage D, a compliance evaluator 127 of the system 115 evaluates cloud resources of the VPC 101 for compliance with security policies 125 attached thereto. The security policies 125 specify policies for secure configuration and/or operation of cloud resources and can be implemented as rules. The security policies 125 may be based on security standards, best practices, or other recommendations/guidelines developed for the CSP that provides the VPC 101 and/or policies developed by an owner of the cloud account with which the VPC 101 is associated. Existing security standards or policies for infrastructure-level cloud security on which the security policies 125 are based may be defined at the level of cloud resources and characteristics of their configurations. In this case, the security policies 125 attached to the compliance evaluator 127 may thus have been effectively "translated" to a higher-level representation which accounts for characteristics of software executing on the cloud resources for enhanced cloud infrastructure security. To this effect, a security policy 125A indicates that there should be no exposure of cloud resources to remote SSH connections established over the Internet based on ingress of SSH traffic. Typically, this policy may be represented as specifying that traffic filters should not allow ingress of network traffic on the standard port for SSH (i.e., port 22). The representation of this policy for which the compliance evaluator 127 checks compliance has been abstracted from the infrastructure-level characteristics of cloud resources because SSH daemons/servers running in the cloud may be listening on a nonstandard port (as is the case in this example), which is not reflected in the data or metadata of the cloud resources alone.

To determine if the traffic filter 137 resource is compliant with the security policy 125A, the compliance evaluator 127 determines the instance(s) to which the traffic filter 137 is related. The compliance evaluator 127 then determines if any of the software running on those instances were identified to use SSH (i.e., as a result of DPI). Traffic filters which allow inbound network traffic on a port on which an SSH daemon/server is listening are allowing exposure of remote SSH connections established to the Internet for the corresponding instance, which poses a security risk to be instance and potentially other cloud resources in the VPC 101. The compliance evaluator 127 queries the repository 123 for data which indicates the traffic filter 137 through submission of a query 135. The compliance evaluator 127 may generate the query 135 to indicate an identifier of the traffic filter 137 as a property value, value in a field-value pair, etc. based on the structure of data stored in the repository 123. For instance, the compliance evaluator 127 may generate a query for retrieval of data for which the identifier of the traffic filter 137 is a value associated with a key-value pair or property/attribute indicating relationships between instances and other cloud resource types. As a result of the query submission, the compliance evaluator 127 obtains the data 131 from the repository 123.

The compliance evaluator 127 evaluates the data 131 based on the security policy 125A. The security policy 125A may be implemented as a rule(s) that a traffic filter should be found noncompliant with the policy if it allows inbound traffic to ingress an instance on a port on which software using SSH that is deployed to the instance is listening. In this example, because the data 131 indicates that the instance 103 related to the traffic filter 137 has software that uses SSH executing thereon, the compliance evaluator 127 determines that the traffic filter 137 does not comply with the security policy 125A. This is because the SSH daemon exposes the instance 103 to SSH connections over the Internet as a result of the traffic filter 137 allowing inbound packets on the port on which the SSH daemon running on the instance 103 is listening.

At stage E, the compliance evaluator 127 generates and indicates a policy compliance evaluation report ("report") 129 based on results of the evaluation against the security policies 125. As the compliance evaluator 127 identifies cloud resources which do not satisfy a corresponding one of the security policies 125, the compliance evaluator 127 can add an indication of each cloud resource and the corresponding security policy with which it is noncompliant to the report 129. In this example, the report 129 indicates that the traffic filter 137 does not comply with the security policy 125A because it allows exposure of SSH connections made over the Internet on port 1222. Therefore, despite the SSH daemon of the software 109 listening on a nonstandard port, the system 115 identified a security policy violation based on information about the software 109 which it determined through DPI and identification of the cloud resources with which the software 109 and instance 103 on which it executes are correlated.

Figure 2:
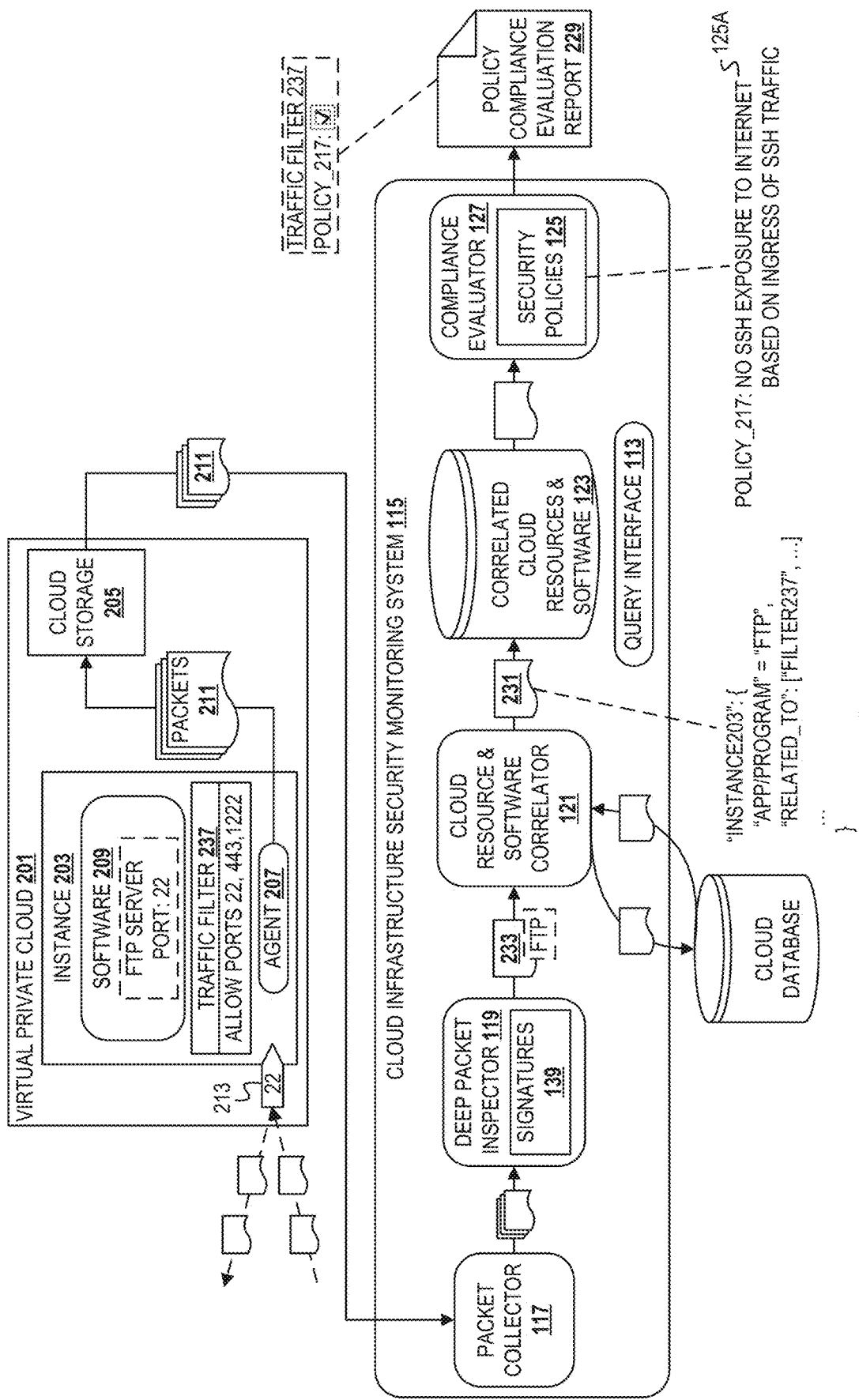
FIG. 2 depicts a conceptual diagram of gaining visibility into software running on cloud infrastructure to improve security monitoring of the cloud infrastructure for reduction in false positive identifications of security policy violations.

FIG. 2 depicts a conceptual diagram of gaining visibility into software running on cloud infrastructure to improve security monitoring of the cloud infrastructure for reduction in false positive identifications of security policy violations. FIG. 2 depicts the system 115 described in reference to FIG. 1. In this example, an instance 203 runs in a VPC 201 that provides a private cloud environment within a public cloud offered by a CSP. Like the instance 103, the instance 203 is a cloud resource such as a virtual server or other cloud instance provided by the CSP for deployment of software in the cloud that has been configured with a network interface (not depicted in FIG. 1) to provide for sending and receiving of network traffic. Software 209 executes on the instance 203. In this example, the software 209 comprises server software to implement an FTP server on the instance 203. The FTP server running on the instance 203 has been configured to use port 22 for connections with FTP clients, which is a nonstandard port for FTP; typically, FTP uses port 21, and port 22 is the standard port for SSH.

A traffic filter 237 for the instance 203 has a first rule by which inbound network traffic is allowed on ports 22, 443, and 1222. The traffic filter 237 is a cloud resource offered by the CSP which provides for filtering of inbound and outbound network traffic for instances running in the VPC 201 based on enforcement of one or more rules with which it has been configured as with the traffic filter 137. An agent 207 similar to the agent 107 is also installed on the instance 203. The agent 207 has been configured to sample packets sent to and from the instance 203. The agent 207 detects packets 211 from sampling and inserts the raw data of the packets 211 into cloud storage 205. The packets 211 are packets sent on an FTP connection established between an FTP client and the FTP server implemented by the software 209.

The system 115 evaluates cloud resources in the VPC 201 based on the security policies 125 and generates a policy compliance evaluation report ("report") 229 as similarly described in reference to Stages A-E of FIG. 1. However, in this example, the deep packet inspector 119 determines that the inspected packet corresponding to the software 209 is associated with an FTP connection and generates DPI 233 indicative of such. Thus, correlated cloud resource and software data ("data") 231 generated by the correlator for the instance 203 indicate that software which uses FTP for inbound and outbound communications is executing on the instance 203 despite the software 209 listening on the port traditionally used for SSH. When evaluating the traffic filter 237 based on the security policy 125A to determine whether SSH traffic is allowed to ingress, conventional approaches to cloud infrastructure security which evaluate data/metadata of cloud resources and their configurations alone without consideration for the applications or server software running on the cloud resources would likely determine that the traffic filter 237 violates the policy. This is because a port-based check would result in identifying that the traffic filter 237 allows ingress of network traffic on the standard port for SSH, yielding the false assumption that SSH traffic is being allowed to ingress for communication to the instance 203. However, the compliance evaluator 127 determines that the instance 203 for which the traffic filter 237 filters traffic is associated with an FTP server rather than an FTP server/daemon. Thus, as indicated in the report 229, the compliance evaluator 127 determines that the traffic filter 237 complies with the security policy 125A because it is not allowing ingress of SSH traffic for any of the instances within the VPC 201.

In some implementations, alternatively or in addition to the compliance evaluator 127 performing a predefined security evaluation based on the security policies 125, an evaluation can be performed through submission of queries to a query interface 113. The query interface 113 is an interface of the repository 123 by which queries can be submitted for additional, custom evaluation of the cloud resources in the VPC 101. Queries submitted to the query interface 113 may be queries for identifying cloud resources in the VPC 101 having certain characteristics, including the characteristics pertaining to the software executing within the VPC 101 and with which the cloud resources may be correlated. An example of a query that may be submitted to the query interface 113 is a query to determine cloud resources having a web server running thereon. With conventional approaches to cloud infrastructure security, the check to determine whether a cloud resource is running a web server would include determining if traffic is being sent and received on port 80 or port 8080. This may return false positives and/or false negatives since web servers may be listening on a nonstandard port and/or other server or application types may be listening on port 80/8080 as a nonstandard port. Because the system 115 determined application/server types executing in the VPC 101 and associated that information with the cloud resources of the VPC 101 with which the applications/servers are correlated, rather than querying the repository 123 for cloud resources having traffic ingress on port 80 or port 8080, the query interface 113 will query the repository 123 for cloud resources which were determined to be running a web server as a result of the DPI performed for packets detected for those cloud resources. This will avoid false positives and/or false negatives which may be returned as a result of checking port numbers alone.

Figure 3:
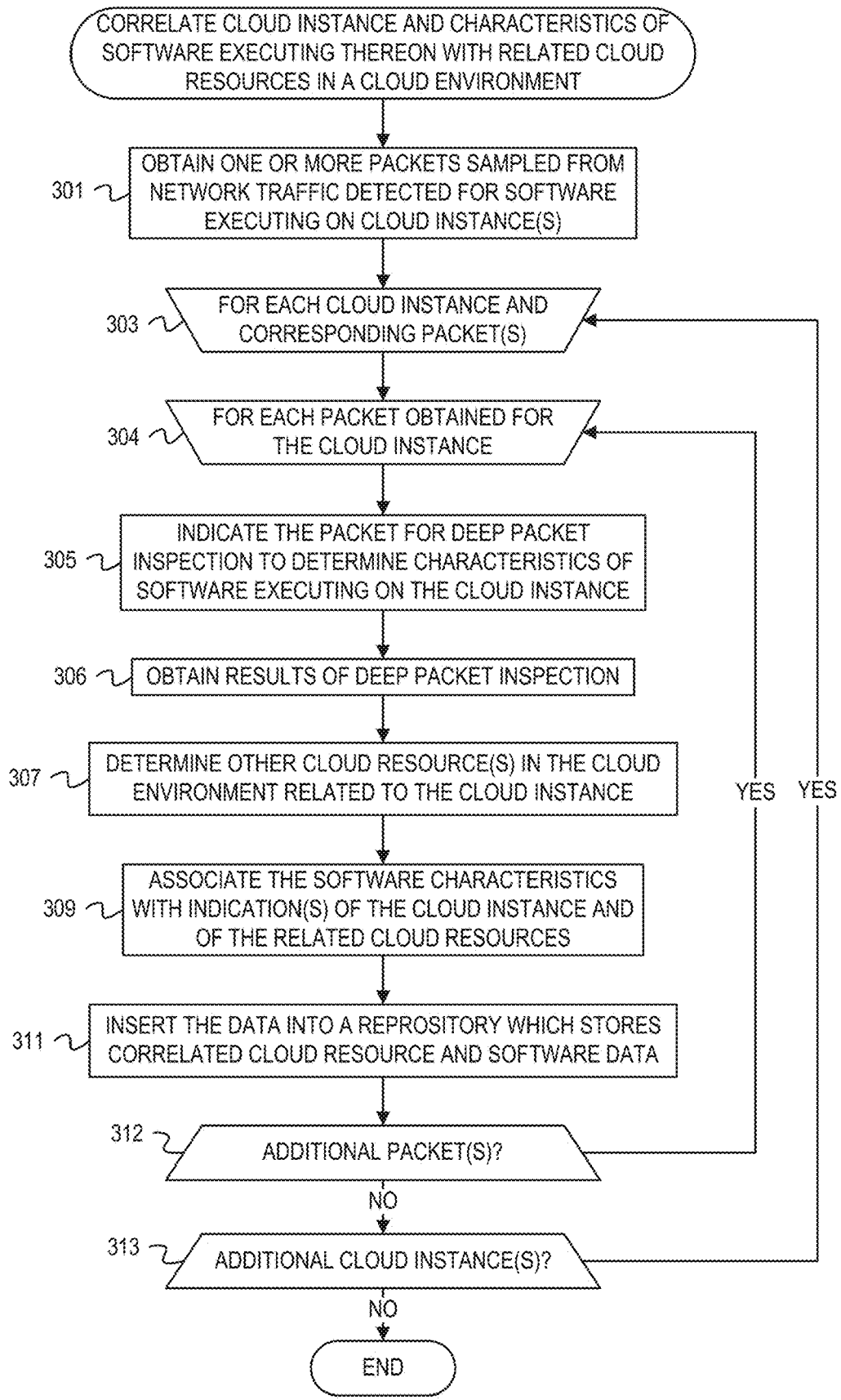
FIG. 3 is a flowchart of example operations for correlating cloud instances and characteristics of software executing thereon with related cloud resources in a cloud environment.
Figure 4:
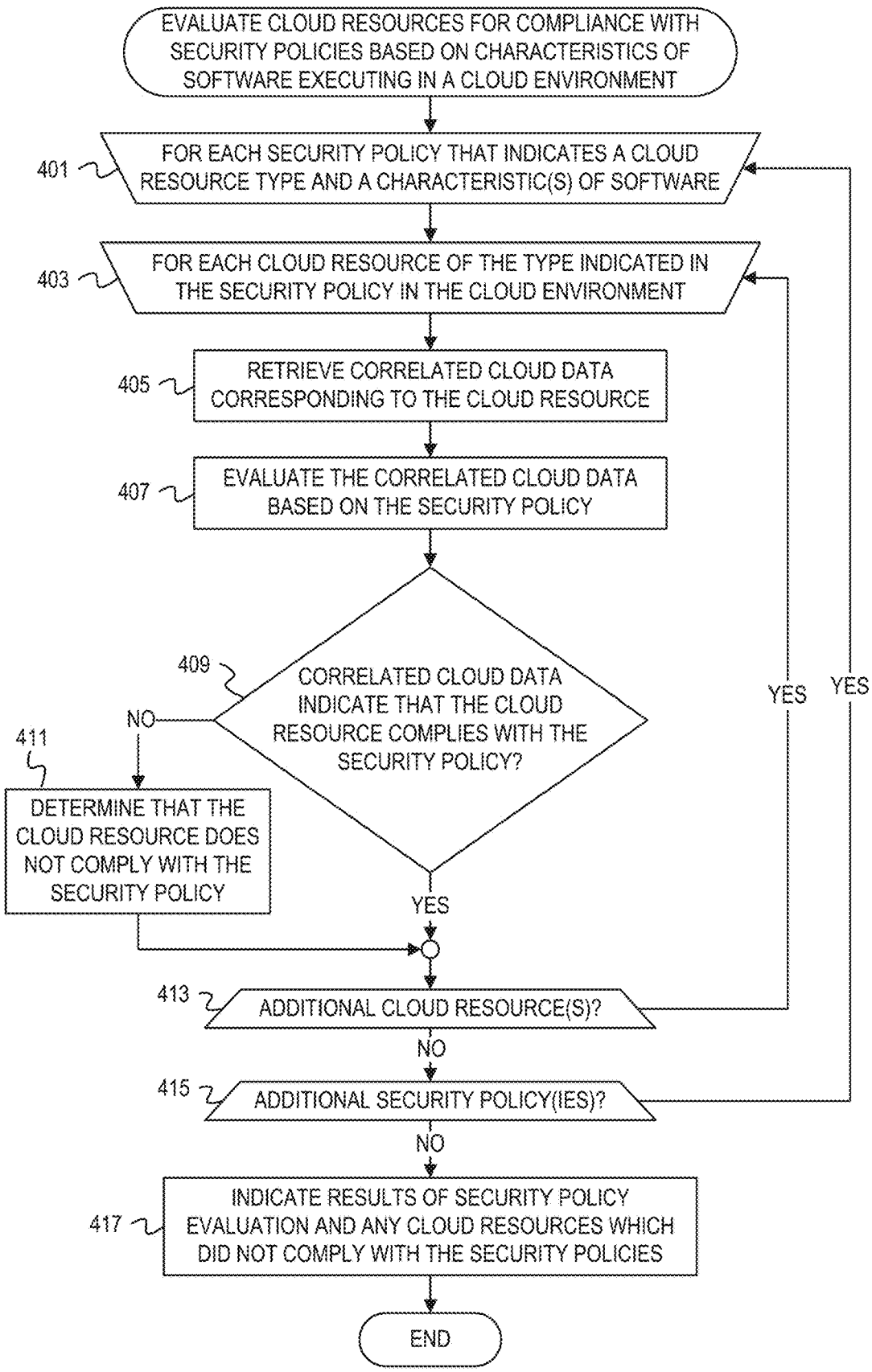
FIG. 4 is a flowchart of example operations for evaluating cloud resources for compliance with security policies based on characteristics of software in a cloud environment.
Figure 5:
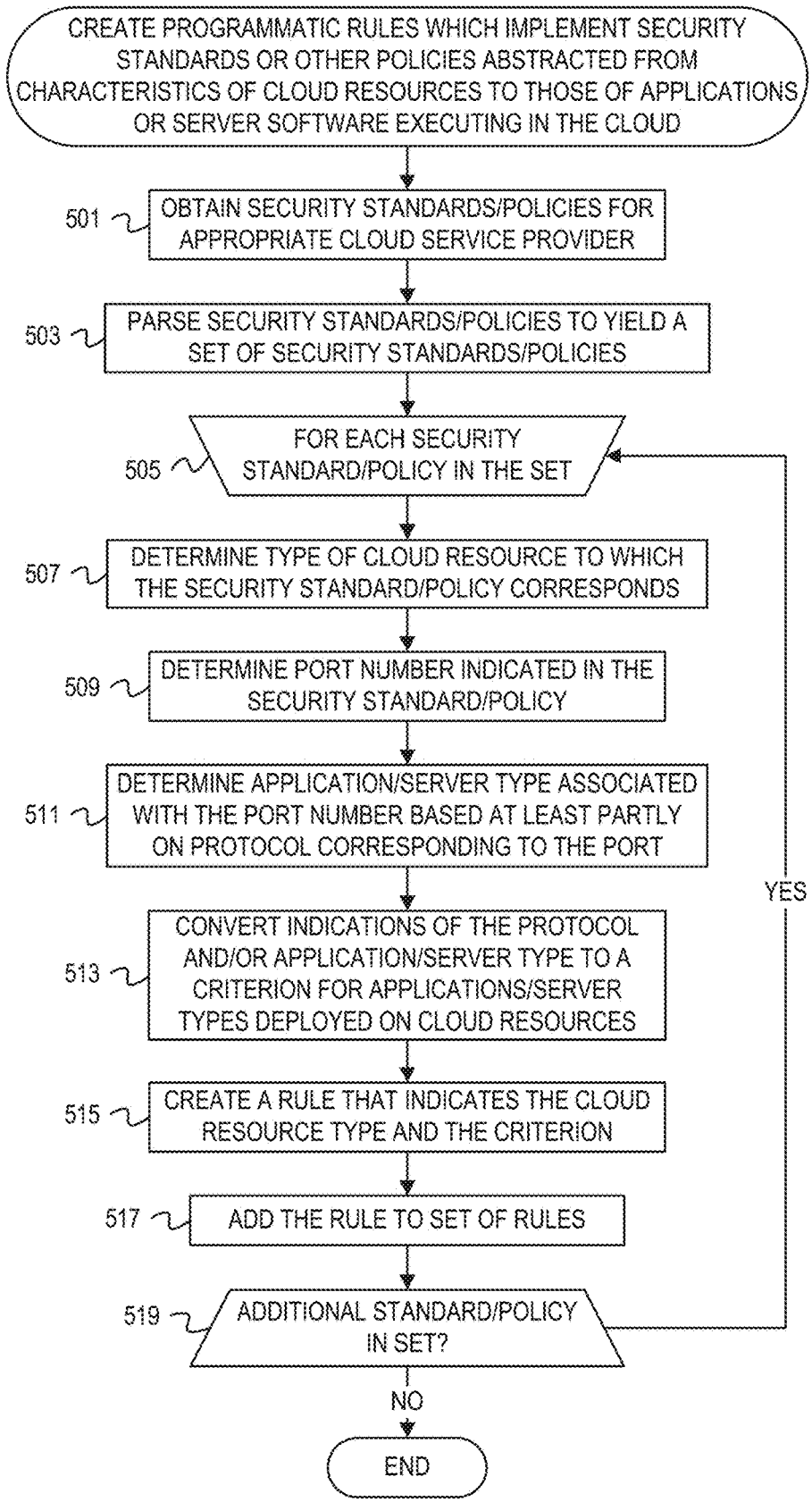
FIG. 5 is a flowchart of example operations for creating programmatic rules which implement security standards or other policies abstracted from characteristics of cloud resources to those of application or server software executing in the cloud.

FIGS. 3-5 are flowcharts of example operations. The example operations are described with reference to a cloud infrastructure security monitoring system (hereinafter "the system") for consistency with the earlier figures. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 3 is a flowchart of example operations for correlating cloud instances and characteristics of software executing thereon with related cloud resources in a cloud environment. A cloud instance refers to cloud resource that comprises a virtual server/virtual machine provided by a CSP for deployment of an application or server software, referred to collectively as "software," in a cloud environment. For example, software can encompass a SaaS application or server software for configuring a cloud instance as a particular type of server (e.g., a web server, FTP server, etc.). While FIG. 3 depicts example operations performed after one packet collection event, in implementations, the example operations may be performed at fixed increments or according to a schedule for packet collection.

At block 301, the system obtains from cloud storage one or more packets sampled from network traffic detected for software executing on at least a first cloud instance. The system may obtain packets from cloud storage at the end of each time window during which packets were sampled. The time window may be a setting of the service with which the service was configured (e.g., a time window of five minutes). The system can submit a request to the cloud storage to obtain the packets via an API of the cloud storage. The request may indicate a location in storage of the packets (e.g., a file path) and may specify the packets which are to be obtained. Packets may be specified in terms of a count of time windows during which packets were sampled, a count of scheduled or fixed packet collection events, or another time period of packet collection. The obtained packets may be in the form raw packet data stored in a compressed file.

In some implementations, the CSP offering the cloud storage may provide a service for packet sampling across cloud instances. If such a service is available, the system obtains the packets from cloud storage upon determining that a configurable time window for sampling or other sampling period has been completed. For instance, the system may receive a notification from the service which indicates a location in storage of the compressed file that comprises the sampled packets during the time window. In other implementations, a streaming service of the CSP can be employed to stream sampled packet data from the location in cloud storage to the system upon storage by the agent or other service which performs the packet sampling or may be streamed directly by the agent or packet sampling service upon sampling the packet data. Streaming of packet data can be performed during a time window of packet sampling that is a configurable setting of the streaming service and also may be scheduled (e.g., for streaming of packet data five minutes an hour). In such cases, the system obtains the packet data over a data stream established between the agent/packet sampling service or cloud storage and the system. Upon successfully obtaining the packet(s), the system may request deletion of the raw packet data from the cloud storage.

At block 303, the system begins iterating through each cloud instance and corresponding packet(s) sampled from network traffic of the cloud instance. At block 304, the system begins iterating over each packet obtained for the cloud instance. The system may have obtained packets sampled across multiple sessions involving the software executing on the instance. Alternatively, or in addition, the system may have obtained packets corresponding to different IP addresses if multiple pieces of software are executing on the cloud instance (i.e., the source or destination IP address of each packet corresponds to one of the pieces of software).

At block 305, the system indicates the packet for DPI to determine characteristics of software executing on the cloud instance. Examples of characteristics of the software include associated communication protocol and port number, type of software (e.g., networking, media, etc.), identity of software (e.g., application name), and/or any other characteristics which can be determined from DPI or traffic classification. The DPI may be performed by a DPI service executing on the system or by a DPI service external to the system to which the system forwards the packet. The DPI may alternatively be performed by a DPI-capable firewall with which the system can communicate, which may be a virtual firewall. In either case, indicating the packet for DPI includes forwarding the packet to the DPI service or firewall for inspection.

At block 306, the system obtains the results of the deep packet inspection. The results of the deep packet inspection may be output by the DPI service or may be included in firewall logs generated by the firewall during inspection. If a DPI service is being used for DPI, the system obtains the output of the DPI which indicates the characteristics of the software. If a firewall is being used for DPI, the system obtains the firewall log data which indicates the characteristics of the software.

At block 307, the system determines one or more other cloud resources in the cloud environment that are related to the cloud instance. Data and/or metadata of the cloud instance can be represented with structured data (e.g., JSON structured data) and organized according to a schema published by the CSP and indicates cloud resources with which the cloud instance has a relationship. For instance, the structured data representing the cloud instance may comprise identifiers and/or names of a network interface(s), subnet(s), traffic filter(s), etc. defined for or in association with the cloud instance. The system obtains the structured data for the cloud instance from the CSP based on submission of a request to the CSP which indicates an identifier and/or name of the cloud instance. For instance, the system can submit the request to a cloud database/repository maintained by the CSP, a service of the CSP which manages cloud resources, etc. via a respective API. The system then determines the cloud resource identifier(s) and/or name(s) by accessing the obtained data/metadata of the cloud instance, such as based on key/field names, property names etc. known to be associated with related cloud resource types (e.g., based on the schema for cloud instance data/metadata published by the CSP).

At block 309, the system associates the software characteristics determined from the DPI with an indication of the cloud instance and indications of each of the other cloud resources to which the cloud instance is related. Associating the software characteristics with the indications of the cloud instance and cloud resource can include storing indications of the software characteristics, an identifier of the cloud instance, and identifiers of each of the one or more related cloud resources in data structure or structured data. Associating can alternatively include labelling, tagging, etc. the data resulting from DPI to result in labelled or tagged data indicating the software characteristics with labels/tags corresponding to the identifiers of the cloud instance and related cloud resource(s). Other techniques for associating the data can be used among implementations. As an example, the system can label data corresponding to the indications of the software characteristics with identifiers of each of the cloud instance on which the software executes, a network interface with which the cloud instance has been configured, and a traffic filter specifying rules for ingress of network traffic for the instance.

At block 311, the system inserts the resulting data into a repository which stores correlated cloud resource and software data. The repository may be indexed by cloud resource identifier (including cloud instance identifiers). As another example, entries in the repository which store indications of software characteristics may be labelled by cloud resource identifier. Additionally, as cloud resources provisioned in the cloud environment are created, updated, and/or deleted, the system may periodically update the correlated cloud data to "refresh" the correlations indicated by data stored therein. For instance, the system may query the cloud repository for cloud resource data corresponding to cloud resources that are accounted for in the repository upon determining (e.g., based on receipt of a notification from the CSP) that one of the cloud resources in the cloud environment has been updated or deleted or that a new cloud resource has been provisioned in the cloud environment. Correlated cloud data indicating updated or deleted cloud resources may then be updated accordingly, such as to remove indications of a deleted cloud resource, and existing correlated cloud data may be updated based on the cloud resource data and relationships associated with newly provisioned/created cloud resources. If a new cloud resource has been provisioned, the system may query the repository for correlated cloud data that indicate the cloud resources that are related to the new cloud resource (e.g., based on the data of the new cloud resource identifying the related cloud resources) and update the determined correlated cloud data to indicate the new cloud resource as being related.

At block 312, the system determines if an additional packet(s) is remaining. If an additional packet(s) was obtained for the cloud instance, operations continue at block 304. If each packet obtained for the cloud instance has been processed and no packets are remaining, operations continue at block 313, where the system determines if another cloud instance(s) is remaining for which one or more packets were collected. If an additional cloud instance(s) is remaining, operations continue at block 303. Otherwise, each of the cloud instances for which packets sampled from network traffic has been accounted for, and operations are complete.

FIG. 4 is a flowchart of example operations for evaluating cloud resources for compliance with security policies based on characteristics of software in a cloud environment. The example operations assume that a repository of correlated cloud resource and software data (hereinafter "correlated cloud data") has been built as described in reference to FIG. 3. The security policies may be based on security compliance standards or other guidelines as described above, any custom security policies to be enforced for the cloud environment that have been defined by a customer (e.g., a security administrator) and attached to the system, or a combination thereof.

At block 401, the system begins iterating over each security policy that indicates a cloud resource type and a characteristic(s) of software that may be executing in the cloud environment. Security policy evaluation may be performed according to a schedule or upon expiration of a configurable interval of time (e.g., 12 hours). Alternatively, or in addition, security policy evaluation may be triggered upon detection of a policy evaluation triggering event, such as detection of a potential security threat in the cloud environment and/or provisioning of new cloud resources in the cloud environment and deployment of software to execute thereon. The characteristic(s) indicated in each security policy can be any of one or more characteristics determined as a result of DPI performed for packets sampled from network traffic sent to or from software executing in the cloud environment. Additionally, the characteristic(s) indicated in a security policy enforced for cloud resources of a certain type are not limited to characteristics associated with that cloud resource type and can encompass any characteristic that may be observable as a result of DPI. Security policies can be implemented as rules which indicate one or more criteria for software with which the cloud resource is correlated. As an example, a security policy for traffic filters controlling inbound and/or outbound traffic for a cloud instance may comprise a rule that traffic filters should not allow SSH traffic on any port. As another example, a security policy for subnets may comprise a rule that any web traffic (i.e., Hypertext Transfer Protocol (HTTP)/HTTP Secure (HTTPS)) sent to/from any cloud resources connected to a particular subnet should be blocked. The security policies that indicate a cloud resource type and a software characteristic(s) may be a subset of security policies against which cloud resources are evaluated—that is, others of the set of security policies may not indicate software characteristics as part of the criteria for compliance with the policies.

At block 403, the system begins iterating over each cloud resource of the type indicated in the security policy that is provisioned in the cloud environment. The system may maintain or have access to indications of cloud resources provisioned in the cloud environment. For instance, the system or security platform of which the system is part may periodically obtain data of cloud resources provisioned in the cloud environment. Data of the cloud resources indicates a type and identifies the corresponding cloud resource, such as with a name, identifier, etc. associated with the cloud resource.

At block 405, the system retrieves correlated cloud data corresponding to the cloud resource. As described above, the correlated cloud data comprise data generated from DPI of a packet associated with an application or server software running on a cloud instance and indications of the cloud resource(s) with which the application or server software is correlated. The system can retrieve the correlated cloud data corresponding to the resource by submitting a query indicating an identifier of the cloud resource to a repository which stores correlated cloud data. The result(s) of the submitted query comprises the correlated cloud data which indicates the cloud resource, such as based on comprising a property, attribute, or key/value pair that indicates a name or identifier of the cloud resource. In some cases, the cloud resource may be correlated with multiple pieces of software (e.g., software across cloud instances), in which the results of the query indicate correlated cloud data for each software with which the cloud resource is correlated.

At block 407, the system evaluates the correlated cloud data based on the security policy. If multiple correlated cloud data were obtained for the cloud resource, the system evaluates each of the correlated cloud data based on the security policy. Evaluating based on the security policy can include evaluating the correlated cloud data against the rule(s) for software characteristics by which the security policy is implemented. In particular, the system can evaluate the one or more software characteristics indicated in the correlated cloud data against the rule(s) for software characteristics.

At block 409, the system determines if the correlated cloud data indicate that the cloud resource complies with the security policy based on results of the evaluation. The correlated cloud data may be determined to comply with the security policy if the software characteristic(s) indicated in the correlated cloud data satisfy the rule(s) for software characteristics by which the security policy is implemented. If multiple correlated cloud data were obtained which correspond to different pieces of software with which the cloud resource is correlated, the system determines whether each of the correlated cloud data satisfied the rule(s) and the cloud resource thus complies with the security policy; otherwise, if any of the correlated cloud data failed to satisfy the rule(s), the cloud resource thus fails to comply with the security policy based on being correlated with one or more software which do not satisfy the rule(s). If the data indicate that the cloud resource does not comply with the security policy, operations continue at block 411. If the data indicate that the cloud resource complies with the security policy, operations continue at block 413.

At block 411, the system determines that the cloud resource does not comply with the security policy. Determining that the cloud resource does not comply with the security policy can include adding an indication of the cloud resource, such as an identifier or name of the cloud resource, to a report indicating results of cloud infrastructure security monitoring. The system may also add a description of the security policy with which the cloud resource does not comply and a reason for noncompliance. The reason for noncompliance can be an indication of the software which contributed to the noncompliance finding determined from the software characteristics that failed to satisfy the rule(s) (e.g., an application name, a server type, etc.) and an indication of the cloud instance on which the software executes to aid in remediation of the security policy violation. If multiple sets of software characteristics failed to satisfy the rule(s) as a result of evaluating multiple correlated cloud data against the rule(s), the reason for noncompliance can be indications of each of the software corresponding to those software characteristics.

At block 413, the system determines if there is an additional cloud resource(s) of the type indicated in the security policy remaining for security policy evaluation. If there is an additional cloud resource(s) remaining, operations continue at block 403. Otherwise, operations continue at block 415, where the system determines if there are one or more security policies remaining based on which cloud resources should be evaluated. If security policies are remaining, operations continue at block 401. Otherwise, security policy evaluation is complete, and operations continue at block 417.

At block 417, the system indicates the results of the security policy evaluation and any cloud resources which did not comply with the security policies. Indicating the results can include indicating the report generated as described at block 411 as incidents of noncompliance were identified.

FIG. 5 is a flowchart of example operations for creating programmatic rules which implement security standards or other policies abstracted from characteristics of cloud resources to those of application or server software executing in the cloud. In some implementations, the security policies against which correlated cloud data are evaluated may have been generated based on security standards/policies published by a security organization (e.g., CIS) for the associated CSP. Characteristics of an application or server type deployed in a cloud environment may have security implications that are not captured in security standards/policies that are defined in terms of cloud resource characteristics alone. The example operations thus describe an example technique for generating abstracted versions of those security standards/policies which account for characteristics of software running on cloud resources for enhanced security standard/policy evaluation. Additionally, the example operations describe an example in which the security standards/policies indicate a port number that is abstracted to the associated communication protocol. Implementations are not limited to security standards/policies which indicate a port number. Security standards/policies indicating any characteristic(s) of a cloud resource(s) can be "translated" to an abstracted representation in a manner similar to that described by the example operations.

At block 501, the system obtains security standards/policies established for the appropriate CSP (i.e., that which offers the cloud resources being evaluated). The security standards/policies may be contained in a file(s) that is provided to the system as input or downloaded from a server of the organization by which they were established.

At block 503, the system parses the security standards/policies to yield a set of security standards/policies. The system can parse the file(s) which includes the security standards/policies to separate the included standards/policies, such as by parsing based on a delimiter associated with an end of line. The parsing may also include tokenizing each of the security standards/policies which result.

At block 505, the system begins iterating over each security standard/policy in the set. At block 507, the system determines a type of cloud resource to which the security standard/policy corresponds. For instance, the system can search the string or plurality of tokens resulting from the parsing at block 503 for a cloud resource type based on a set of cloud resource types defined for the CSP which the system maintains.

At block 509, the system determines a port number indicated in the security standard/policy. Security standards or policies generally indicate standard port numbers. The system may maintain a data structure which associates standard port numbers for various communication protocols with the corresponding communication protocols (e.g., port 22 for SSH, port 3389 for Remote Desktop Protocol (RDP), etc.), such as in a data structure which associates port numbers with protocols. The system can search the security standard/policy resulting from the parsing for a numerical value which corresponds to the known protocols.

At block 511, the system determines the application or server type associated with the port number based at least partly on the protocol corresponding to the port. The system determines the communication protocol for which the determined port number is the standard port based on a lookup of the determined port number in the data structure which associates port numbers and protocols. The determined communication protocol will correspond to a type of application or server that sends/receives network traffic according to the communication protocol. As an example, HTTP, which uses port 80 or port 8080, is associated with web servers on which web applications run.

At block 513, the system converts indications of the protocol and/or application/server type to a criterion for applications/server types deployed on cloud resources. The criterion may be a positive criterion which yields a determination that the cloud resource is in compliance with the security standard/rule upon satisfaction of the criterion or may be a negative criterion which yields a determination that the cloud resource is not in compliance upon satisfaction of the criterion. The criterion may be represented as a Boolean condition to which the system converts the determined protocol and/or the application/server type. As part of the conversion to the criterion, the system can determine based on the parsed representation of the security standard/policy whether the criterion should comprise a "NOT" or "FALSE" condition. For instance, the system may search the standard/policy for one or more tokens which it has been configured to recognize as such conditions (e.g., "no," "should not," "is not," etc.") or may use natural language processing techniques to determine whether such a condition is reflected in the standard/policy. As an example, a security standard initially represented as "traffic filters should not allow ingress of network traffic from any source address on port 22" may be converted to a positive criterion of "protocol !=SSH AND port=any" or a negative criterion of "protocol=SSH AND port=any."

At block 515, the system creates a rule that indicates the cloud resource type and the criterion. The system can create the rule by converting the indication of the cloud resource type and the criterion to a conditional. For instance, returning to the previous example, the system can convert the security standard for traffic filters to "IF protocol !=ssh AND src_addr=0.0.0.0/0 THEN rsrc.compliant=true."

At block 517, the system adds the rule to a set of rules. The set of rules comprises programmatic representations of the security standards/policies against which correlated cloud data will be evaluated as described above. At block 519, the system determines if there is an additional security standard/policy in the set. If there is an additional security standard/policy to be processed, operations continue at block 505. Otherwise, operations are complete.

Figure 6:
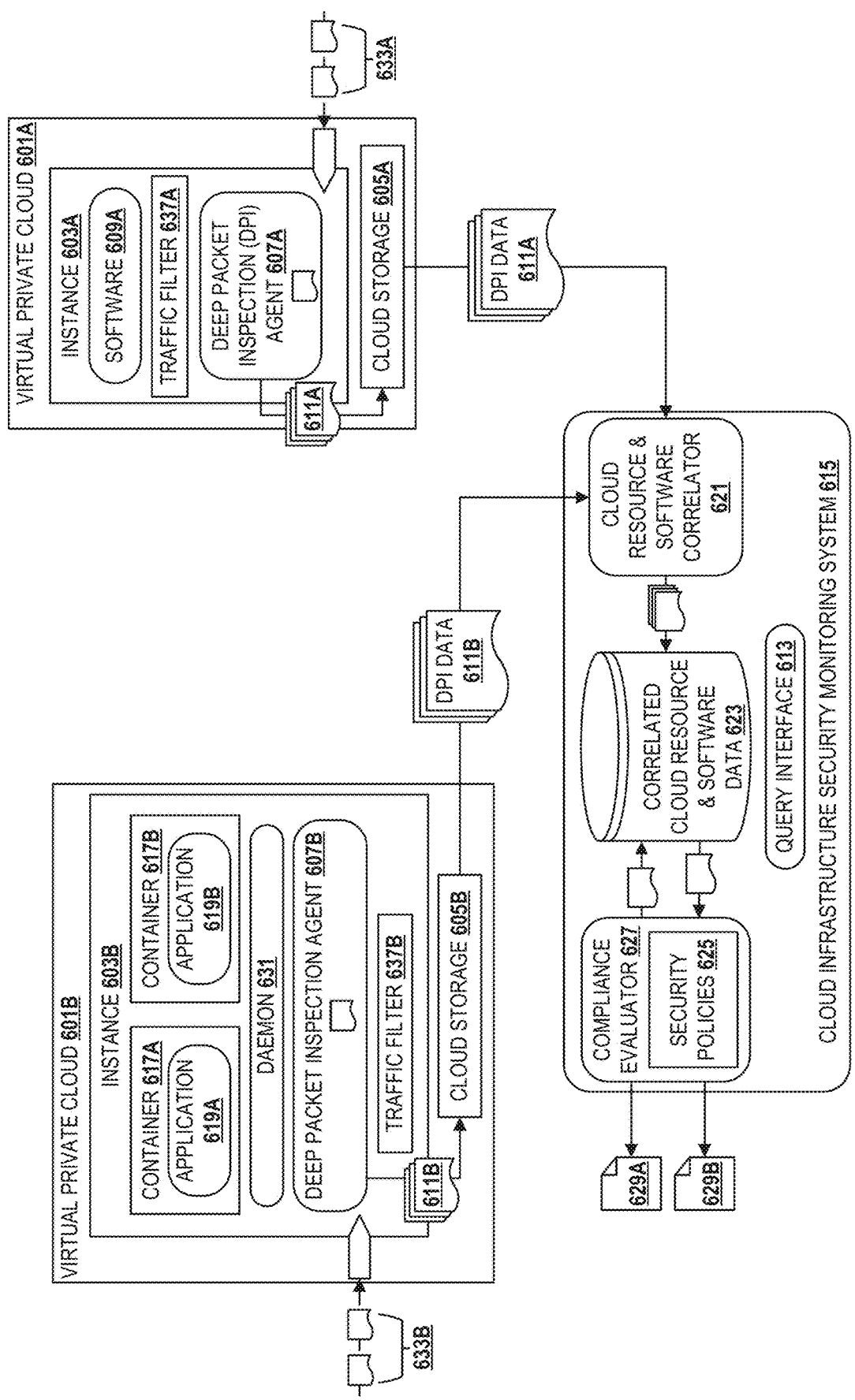
FIG. 6 depicts a conceptual diagram of an agent-based approach to performing deep packet inspection for packets sampled from network traffic of cloud instances.

FIG. 6 depicts a conceptual diagram of an agent-based approach to performing deep packet inspection for packets sampled from network traffic of cloud instances. FIG. 6 depicts a VPC 601A and a VPC 601B. Similar to the examples depicted in FIG. 1 and FIG. 2, a cloud infrastructure monitoring system ("system") 615 comprises a cloud resource and software correlator ("correlator") 621, a repository 623 of correlated cloud data, and a compliance evaluator 627. The compliance evaluator 627 evaluates correlated cloud data that were generated by the correlator 621 based on security policies 625 to generate a policy compliance evaluation report 629A and a policy compliance evaluation report 629B that indicate whether cloud resources provisioned in the VPC 601A and VPC 601B, respectively, comply with the security policies 625. Alternatively, or in addition, queries can be submitted to the repository 623 via a query interface 613 for custom queries executed on correlated cloud data of either of the VPCs 601A-B. The cloud resources provisioned in the VPC 601A include an instance 603A and a traffic filter 637A. The cloud resources provisioned in the VPC 601B include an instance 603B and a traffic filter 637B.

Software 609A executes on the instance 603A. The instance 603B acts as a host for containers to provide a containerized environment, in which a container 617A and a container 617B are deployed. An application 619A that is a containerized application executes in the container 617A. An application 619B that is a containerized application executes in the container 617B. A daemon 631 executes on the instance 603B to support the containers 617A-B and their respective applications 619A-B. The daemon 631 may, for instance, perform container management for the container 617A-B and handle API requests submitted to the containerization platform that manages the containers 617A-B. As an example, the daemon 631 may be a Docker daemon. In other examples, a different process or service may execute on a cloud instance to which one or more containerized applications are deployed according to the containerization platform being utilized.

In this example, rather than a DPI service executing as part of the system 615, a DPI agent 607A executes on the instance 603A, and a DPI agent 607B executes on the instance 603B. The DPI agents 607A-B comprise DPI services which execute in the cloud environment via deployment of the DPI agents 607A-B to the respective ones of the instances 603A-B. The DPI agents 607A-B perform DPI of packets sampled from network traffic of the instances 603A-B; in particular, the DPI agent 607A inspects packets sampled from network traffic 633A of the instance 603A that is destined for the software 609A, and the DPI agent 607B inspects packets sampled from network traffic 633B of the instance 603B that is destined for one of the applications 619A-B.

Sampling of packets from network traffic can be performed by the DPI agents 607A-B as network traffic of the instances 603A-B is detected or can be performed by obtaining packet data from cloud storage 605A or cloud storage 605B for the VPC 601A and VPC 601B, respectively. For instance, another agent that is provided by the CSP which offers the VPCs 601A-B and instantiated/configured by the system 615 to sample packets such as the agent 107 in FIG. 1 may execute on each of the instances 603A-B and perform the sampling of packets from network traffic 633A-B. In this case, as the cloud native agents sample packets as similarly described in reference to FIG. 1 with respect to the agent 107, the packet data are stored in cloud storage 605A for the instance 603A and cloud storage 605B for the instance 603B. The DPI agents 607A-B can then retrieve the raw packet data from the respective locations in cloud storage 605B and 605A in which the cloud native agents stored the data. If the CSP offers a packet sampling service that can be configured to sample packets from network traffic for either of the instances 603A-B as also described above, the service can perform the packet sampling during a configurable sampling period (e.g., during a scheduled time window) and store the sampled packet data in the respective cloud storage 605A-B. The agents 607A-B can then retrieve the sampled packet data from the respective cloud storage 605A-B upon determining that the sampling period has been completed, such as based on the service communicating a notification to the agents 607A-B that indicates the location in cloud storage of the packet data sampled during the sampling period. Sampling of packets can be implemented such that incoming or outgoing packets are intercepted, inspected by the respective one of the agents 607A-B or stored in the respective cloud storage 605A-B, and subsequently redirected to their destination, though the mechanism by which packets are sampled from the flow of network traffic can vary.

After sampling of packets from network traffic, the DPI agent 607A performs DPI of the packets sampled from the network traffic 633A of the instance 603A. The DPI agent 607B performs DPI of the packets sampled from network traffic 633B of the instance 603B that is destined for one of the applications 619A-B. Like the agent 107, the DPI agents 607A-B can perform packet sampling according to a schedule, during a specified time window that is a configurable setting of the agents 607A-B, or at fixed intervals. As with the deep packet inspector 119, the DPI agents 607A-B generate DPI data 611A-B based on various DPI techniques (e.g., traffic classification through signature matching, determination of the associated communication protocol, etc.) that comprise indications of characteristics of software executing on the respective ones of the instances 603A-B. The DPI agent 607A stores the DPI data 611A in the cloud storage 605A of the VPC 601A, and the DPI agent 607B stores the DPI data 611B in the cloud storage 605B of the VPC 601B. If raw, uninspected packet data was stored in the cloud storage 605A and/or cloud storage 605B, the respective one of the DPI agents 607A-B may delete the raw packet data upon completion of the DPI to conserve storage and reduce costs of use of the cloud storage resource. The correlator 621 can then obtain the DPI data 611A from the cloud storage 605A and the DPI data 611B from the cloud storage 605B for correlation and subsequent security policy compliance evaluation by the compliance evaluator 627 as described above.

Also, in this example, the correlator 621 inserts the correlated cloud data generated for both DPI data 611A-B into the repository 623. Entries in the repository 623 that comprise correlated cloud data may be labeled by an identifier of the VPC with which the correlated cloud data are associated, or the repository 623 may be indexed by VPC identifier. In other examples, the system 615 may utilize one repository per VPC that may be maintained by the system 615 or maintained on a server external to the system 615; that is, correlated cloud data generated for each of the VPCs 601A-B would be stored in different repositories.

As can be seen in FIGS. 1, 2, and 6, the capabilities of agents executing on instances provisioned for a cloud environment such as a VPC can vary among configurations of the agent-based approach, such as whether a DPI-capable agent is executing on the instance as an alternative or in addition to a CSP-provided agent, as well as among CSPs and the agent capabilities that they provide. As is also described above, substantially agentless approaches are possible in which the CSP offering the cloud environment being evaluated provides a packet sampling service that can be utilized for sampling raw packet data from network traffic and exporting the sampled packet data to the system for correlation and security policy evaluation. Implementations can utilize any of these approaches to sample/obtain the raw packet data for DPI.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, with respect to FIG. 3, the operations depicted in blocks 305-311 can be performed in parallel or concurrently across packets and/or cloud instances. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 7:
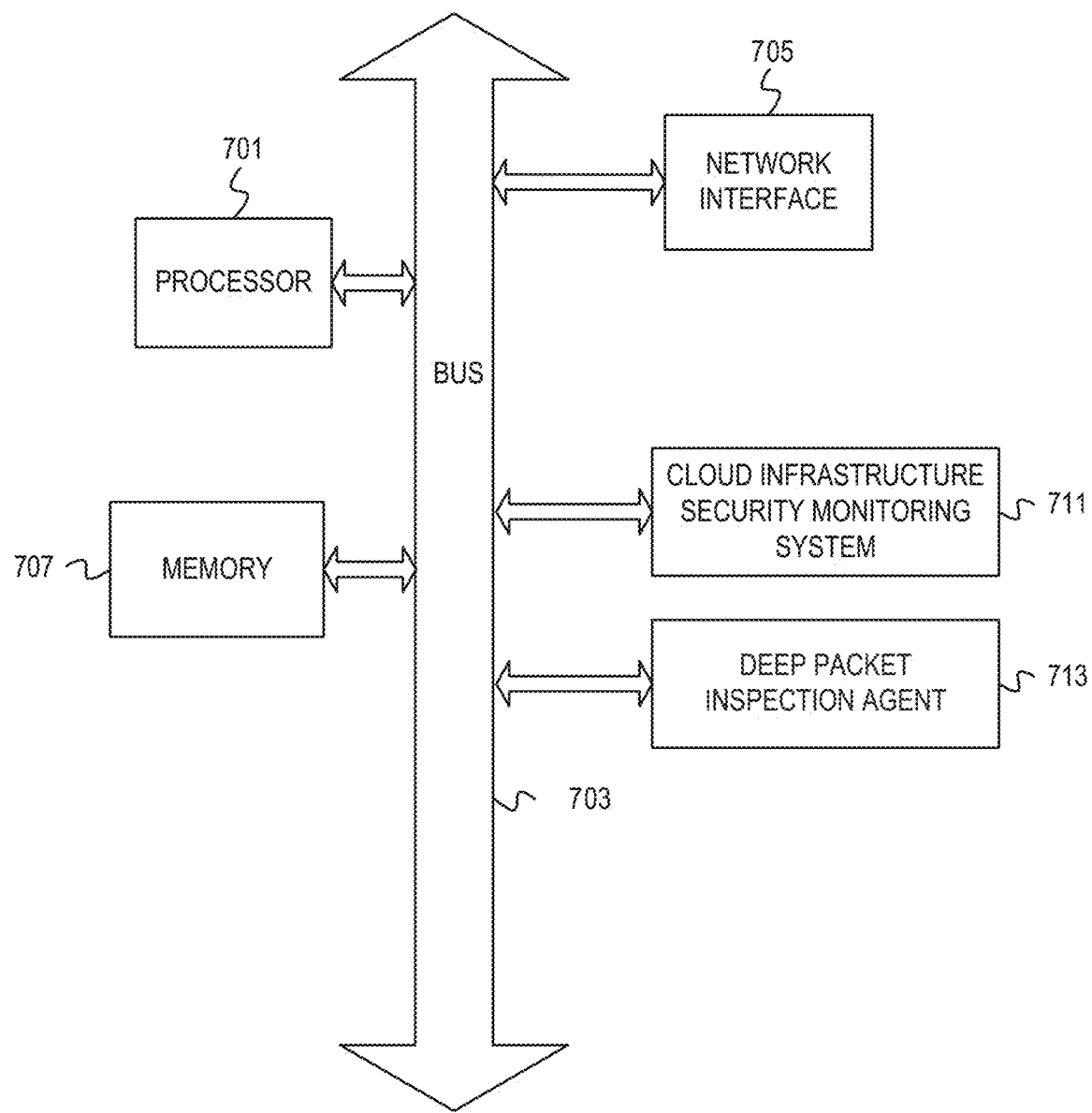
FIG. 7 depicts an example computer system with a cloud infrastructure security monitoring system and a deep packet inspection agent.

FIG. 7 depicts an example computer system with a cloud infrastructure security monitoring system and a deep packet inspection agent. The computer system includes a processor 701 (possibly including multiple processors, multiple cores, multiple nodes, and/or implementing multi-threading, etc.). The computer system includes memory 707. The memory 707 may be system memory or any one or more of the above already described possible realizations of machine-readable media. The computer system also includes a bus 703 and a network interface 705. The system also includes cloud infrastructure security monitoring system 711 and deep packet inspection agent 713. The cloud infrastructure security monitoring system 711 evaluates resources of cloud infrastructure for compliance with security policies based on characteristics of software executing on the cloud infrastructure determined from deep packet inspection of packets sampled from network traffic of the software. The deep packet inspection agent 713 can execute on a cloud instance and performs deep packet inspection of packets sampled from network traffic of the cloud instance. The cloud infrastructure security monitoring system 711 and the deep packet inspection agent 713 do not necessarily execute as part of the same system. For instance, while the deep packet inspection agent 7113 may execute on a cloud instance within a cloud environment, the cloud infrastructure security monitoring system 711 may execute on a different server that is external to the cloud environment. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701.

While the aspects of the disclosure are described with reference to various implementations and exploitations, it will be understood that these aspects are illustrative and that the scope of the claims is not limited to them. In general, techniques for enhanced cloud infrastructure security through correlating cloud resources with characteristics of software executing on the cloud infrastructure as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

The invention claimed is:

1. A method comprising:
    determining one or more characteristics of software that executes on a first instance in a cloud environment based on analysis of first data obtained for the first instance;
    determining a first cloud resource of the cloud environment that is related to the first instance based on at least one of metadata and data of the first instance; and
    evaluating compliance of the first cloud resource with a first security policy based on the one or more characteristics determined for the software executing on the first instance.

2. The method of claim 1, wherein the first data comprises a first packet obtained for the first instance, wherein determining the one or more characteristics of the software comprises inspecting the first packet with deep packet inspection and determining the one or more characteristics based on results of deep packet inspection of the first packet.

3. The method of claim 1, further comprising indicating compliance of the first cloud resource with the first security policy based on results of evaluating compliance of the first cloud resource with the first security policy.

4. The method of claim 1, wherein evaluating compliance of the first cloud resource with the first security policy comprises evaluating compliance of the first cloud resource with the first security policy based, at least in part, on a type of the first cloud resource, wherein the first security policy indicates the type of the first cloud resource.

5. The method of claim 1, wherein the first security policy comprises a rule indicating one or more criteria for characteristics of software that can be determined based on inspection of packets sampled from network traffic of the cloud environment, wherein evaluating compliance comprises evaluating the one or more characteristics based on the one or more criteria indicated in the rule.

6. The method of claim 1, further comprising obtaining the at least one of metadata and data of the first instance from a provider of the cloud environment, wherein the at least one of metadata and data of the first instance indicate one or more cloud resources with which the first instance has a relationship, wherein the one or more cloud resources includes the first cloud resource.

7. The method of claim 1, further comprising correlating the one or more characteristics of the software executing on the first instance with an indication of the first cloud resource that is related to the first instance to generate correlated data, wherein evaluating compliance of the first cloud resource with the first security policy comprises evaluating the correlated data based on the first security policy.

8. The method of claim 1, wherein the first data were obtained for the first instance by at least one of an agent executing in the cloud environment and a service offered by a provider of the cloud environment.

9. The method of claim 8, further comprising obtaining the first data from cloud storage of the cloud environment, wherein the first data comprises a first packet that was sampled from network traffic corresponding to the first instance by at least one of the agent and the service offered by the provider of the cloud environment, and wherein at least one of the agent and the service stored the first packet in the cloud storage based on sampling of the first packet from network traffic.

10. The method of claim 1, wherein the software executing on the first instance comprises application software or server software.

11. One or more non-transitory machine-readable media having program code stored thereon, the program code comprising instructions to:
    determine one or more characteristics of software that executes on a first instance in a cloud environment based on analysis of first data obtained for the first instance;
    determine a first cloud resource of the cloud environment that is related to the first instance based on at least one of metadata and data of the first instance; and
    evaluate compliance of the first cloud resource with a first security policy based on the one or more characteristics determined for the software executing on the first instance.

12. The non-transitory machine-readable media of claim 11, wherein the first data comprises a first packet obtained for the first instance, wherein the instructions to determine the one or more characteristics of the software comprise instructions to inspect he first packet with deep packet inspection and determine the one or more characteristics based on results of deep packet inspection of the first packet.

13. The non-transitory machine-readable media of claim 11, wherein the program code further comprises instructions to indicate compliance of the first cloud resource with the first security policy based on results of evaluating compliance of the first cloud resource with the first security policy.

14. The non-transitory machine-readable media of claim 11, wherein the first data were obtained for the first instance by at least one of an agent executing in the cloud environment and a service offered by a provider of the cloud environment.

15. An apparatus comprising:
    a processor; and
    a machine-readable medium having instructions stored thereon that are executable by the processor to cause the apparatus to, determine one or more characteristics of software that executes on a first instance in a cloud environment based on analysis of first data obtained for the first instance;

determine a first cloud resource of the cloud environment that is related to the first instance based on at least one of metadata and data of the first instance; and evaluate compliance of the first cloud resource with a first security policy based on the one or more characteristics determined for the software executing on the first instance.

16. The apparatus of claim 15, wherein the first data comprises a first packet obtained for the first instance, wherein the instructions executable by the processor to cause the apparatus to determine the one or more characteristics of the software comprise instructions executable by the processor to cause the apparatus to inspect he first packet with deep packet inspection and determine the one or more characteristics based on results of deep packet inspection of the first packet.

17. The apparatus of claim 15, further comprising instructions executable by the processor to cause the apparatus to indicate compliance of the first cloud resource with the first security policy based on results of evaluating compliance of the first cloud resource with the first security policy.

18. The apparatus of claim 15, further comprising instructions executable by the processor to cause the apparatus to obtain the at least one of metadata and data of the first instance from a provider of the cloud environment, wherein the at least one of metadata and data of the first instance indicate one or more cloud resources with which the first instance has a relationship, wherein the one or more cloud resources includes the first cloud resource.

19. The apparatus of claim 15, wherein the first data were obtained for the first instance by at least one of an agent executing in the cloud environment and a service offered by a provider of the cloud environment.

20. The apparatus of claim 19, further comprising instructions executable by the processor to cause the apparatus to obtain the first data from cloud storage of the cloud environment, wherein the first data comprises a first packet that was sampled from network traffic corresponding to the first instance by at least one of the agent and the service offered by the provider of the cloud environment, and wherein at least one of the agent and the service stored the first packet in the cloud storage based on sampling of the first packet from network traffic.

* * * * *